INVENTOR.
LOUIS A. PAZANDAK
BY
Braddock and Braddock
ATTORNEYS

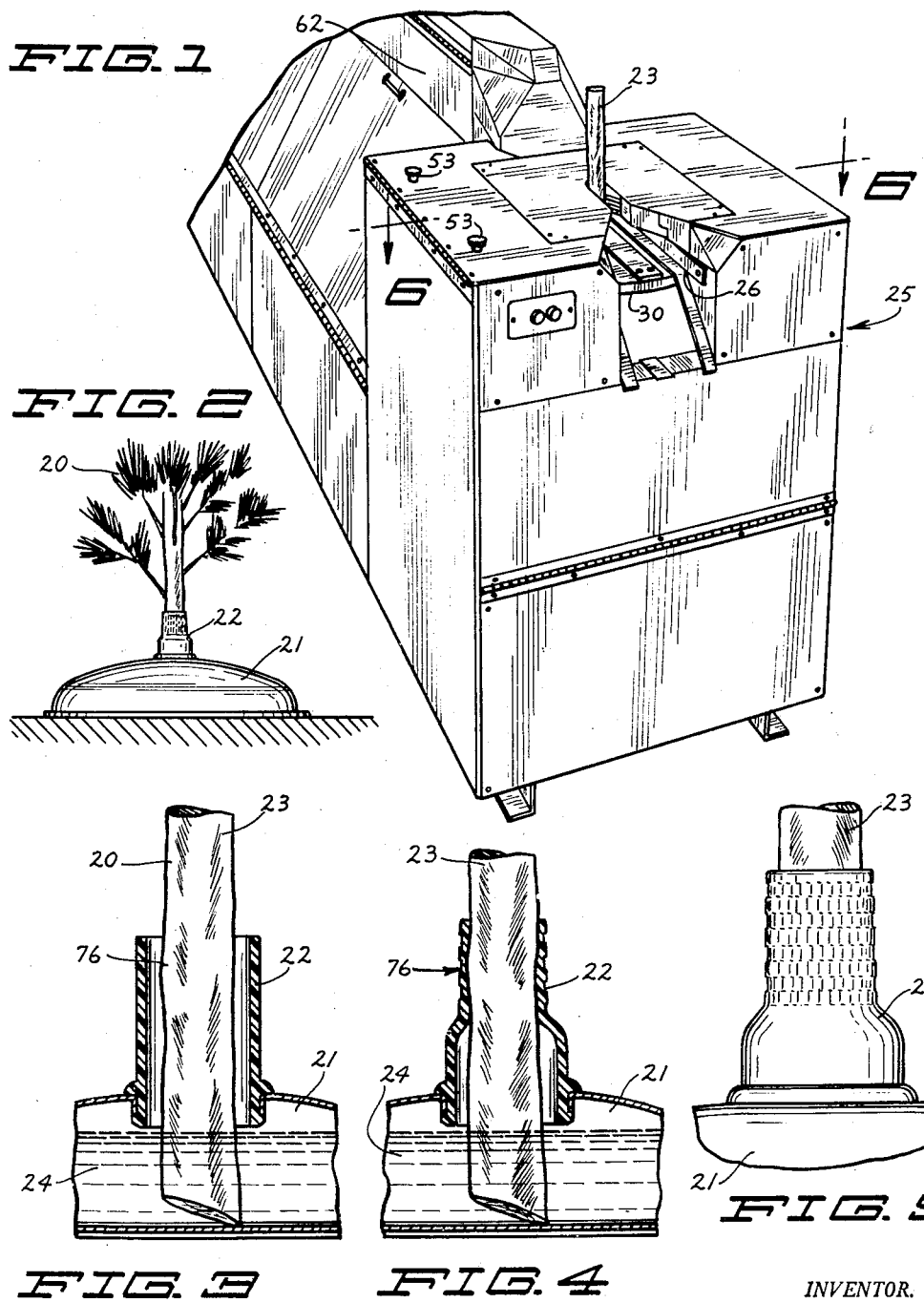

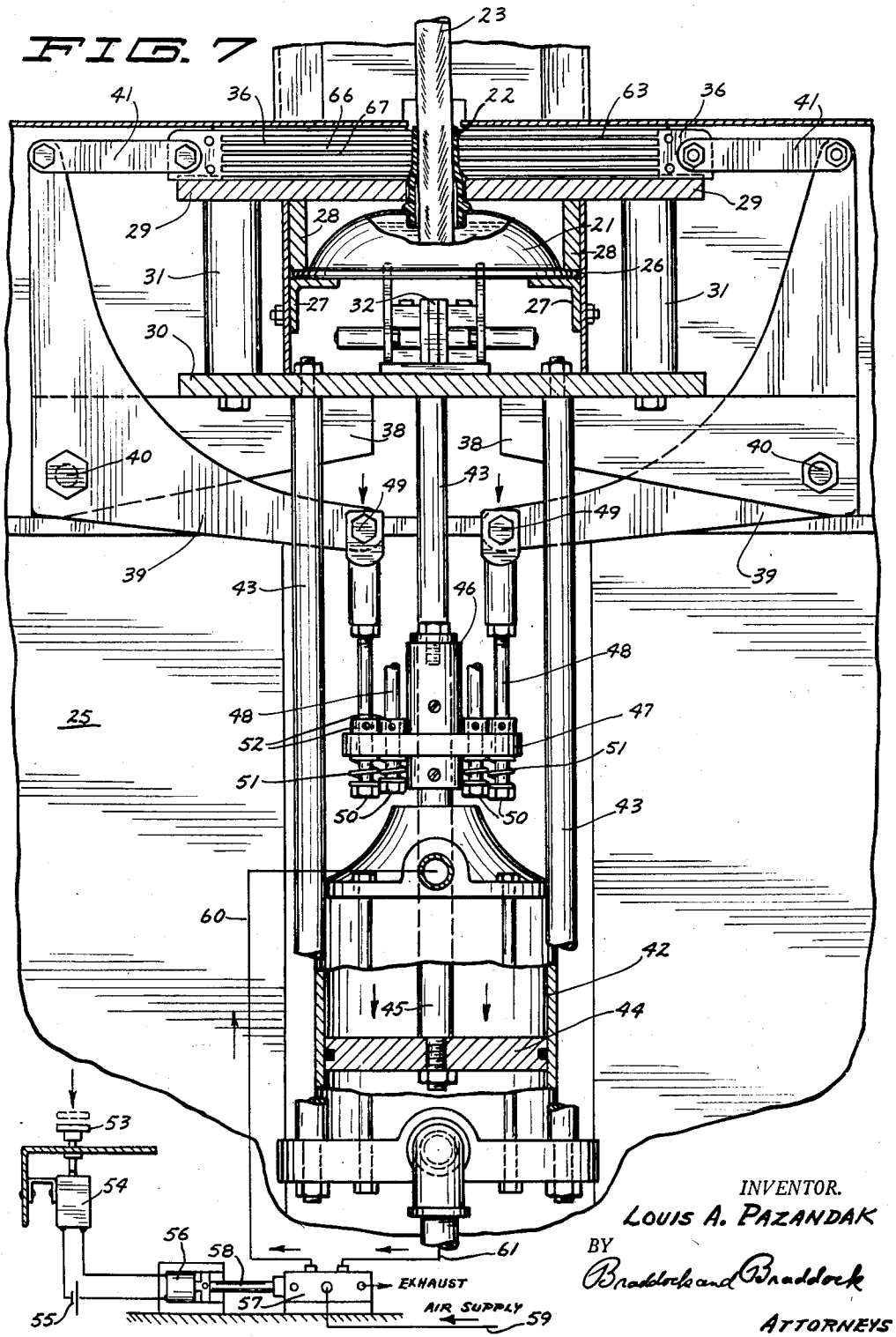

June 17, 1958  L. A. PAZANDAK  2,838,789
METHOD AND MACHINE FOR CONSTRICTING COLLAR ONTO SHAFT
Filed April 19, 1956  4 Sheets-Sheet 4
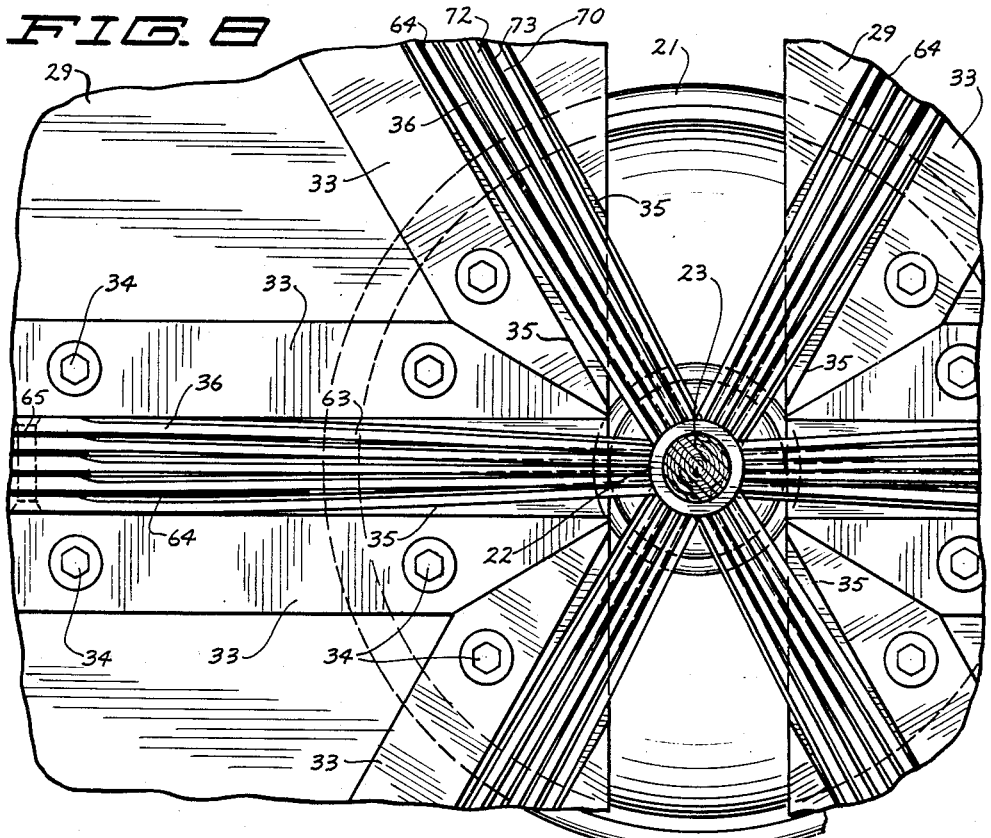
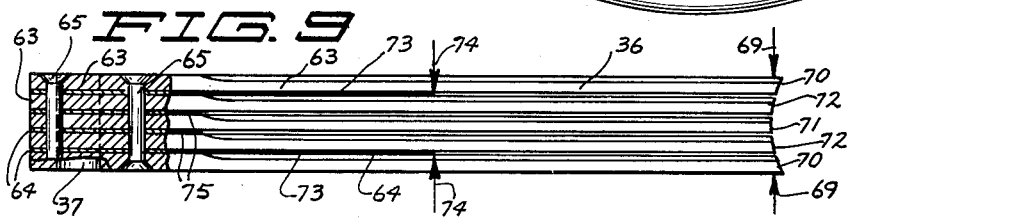
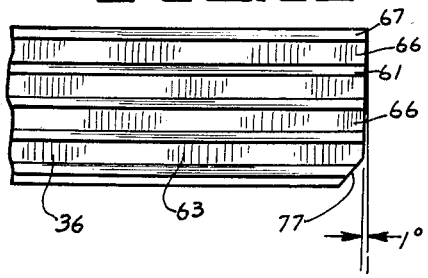 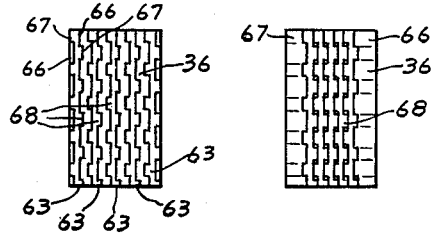
INVENTOR.
LOUIS A. PAZANDAK
BY
Braddock and Braddock
ATTORNEYS

United States Patent Office 2,838,789
Patented June 17, 1958

2,838,789

METHOD AND MACHINE FOR CONSTRICTING COLLAR ONTO SHAFT

Louis A. Pazandak, Minneapolis, Minn., assignor to Halvorson Trees, Inc., Duluth, Minn., a corporation of Minnesota Application April 19, 1956, Serial No. 579,274

8 Claims. (Cl. 18—1)

This invention has relation to a method of and a machine for constricting a collar onto a shaft. This method and machine are particularly useful for causing a plastic collar in a semi-fluid state or other malleable collar to be constricted onto a tree trunk to have leak-proof relationship thereto.

In a machine made according to the present invention, a plurality of sliding plungers converge on a plastic collar and tree trunk positioned therein along radii of said collar. These plungers, acting together, contact the collar initially around its entire circumference and are then forced in toward the tree trunk carrying the collar ahead of them. Each of these sliding plungers is made up of a plurality of parallel plates spaced from each other at forward ends thereof.

The plungers are so constructed that outer rows of plates of each of the plungers will contact adjacent outer rows of adjacent plungers as the plungers are moved in toward the tree trunk and the construction of these plungers is such that after this contact has been made, the forward surface of each of these plates will be caused to move toward the tree trunk along a radius of the collar.

The machine will perform the operation just described while the collar is in a heated, semi-fluid state. The plungers will be held in contact with the collar until the collar sets up and hardens.

The machine of the present invention and the method will work particularly well when used to constrict plastic collars mounted in Christmas tree stands to have leak-proof relationship to Christmas trees. While the apparatus just described works satisfactorily in most instances even when the forward surfaces of the plates are smooth and generally rectangular in configuration, it has been found that the irregularity in the bark of the Christmas tree is such that tiny pipes or passageways will sometimes form along portions of the collar adjacent the tree which were initially not in the alinement with said forward surfaces of said plates. In order to prevent the possibility of the formation of such pipes which would spoil the leak-proof seal between the collar and the tree trunk, an interlocking or zig-zag configuration to the forward end of the plates was developed. The forward end of each plate which comes in contact with the collar is composed as if it were a thin vertical strip of metal having a plurality of rectangular bars integral therewith and extending outwardly from both vertical surfaces thereof. The bars extending outwardly from a first side of a first plate are positioned in interlocking relationship to the bars which extend outwardly from the facing side of an adjacent plate so that at the time the sliding plungers are constricting the collar against the tree trunk, these bars are in vertical overlapping relationship with each other and there is no vertical increment of the surface of the collar facing the tree trunk which is not directly in radial alinement with some portion of one of the plates. This results in the elimination of the possibility of a vertical pipe or passageway between the inner surface of the collar and the tree trunk which would spoil the leak-proof relationship between these two elements.

In the drawings,

Fig. 1 is a perspective view of a machine made according to the present invention showing its association to a machine for bringing the plastic collars to a state of semifluidity;

Fig. 2 is an elevational view of a Christmas tree stand and a Christmas tree showing the relationship of the tree trunk to the plastic collar of said stand;

Fig. 3 is an enlarged, vertical section of the Christmas tree and stand of Fig. 2 but showing the collar before it is constricted onto said tree;

Fig. 4 is an enlarged, vertical sectional view of the tree and stand of Fig. 2 showing the collar after it has been constricted thereon;

Fig. 5 is an enlarged, fragmentary, elevational view of the tree and stand of Fig. 2;

Fig. 7 is a vertical sectional view taken on the line 7—7 in Fig. 6;

Fig. 8 is an enlarged fragmentary top plan view of a portion of the machine as seen in Fig. 6 but showing the relationship of the parts when the sliding plungers are in position to have caused the plates to have tightly constricted a plastic collar of a tree stand around the tree trunk;

Fig. 9 is a top plan view of one of the sliding plungers of the present invention with parts in section;

Fig. 10 is an enlarged side elevational view of the sliding plunger of Fig. 9;

Fig. 11 is an end view of the sliding plunger of Fig. 9 with the plates in a normal unconstricted position; and Fig. 12 is an end view of the sliding plunger of Fig. 9 but with the forward surfaces of the plates compressed together as they would be in constricting a collar on a tree trunk of minimum size.

Figure 6:
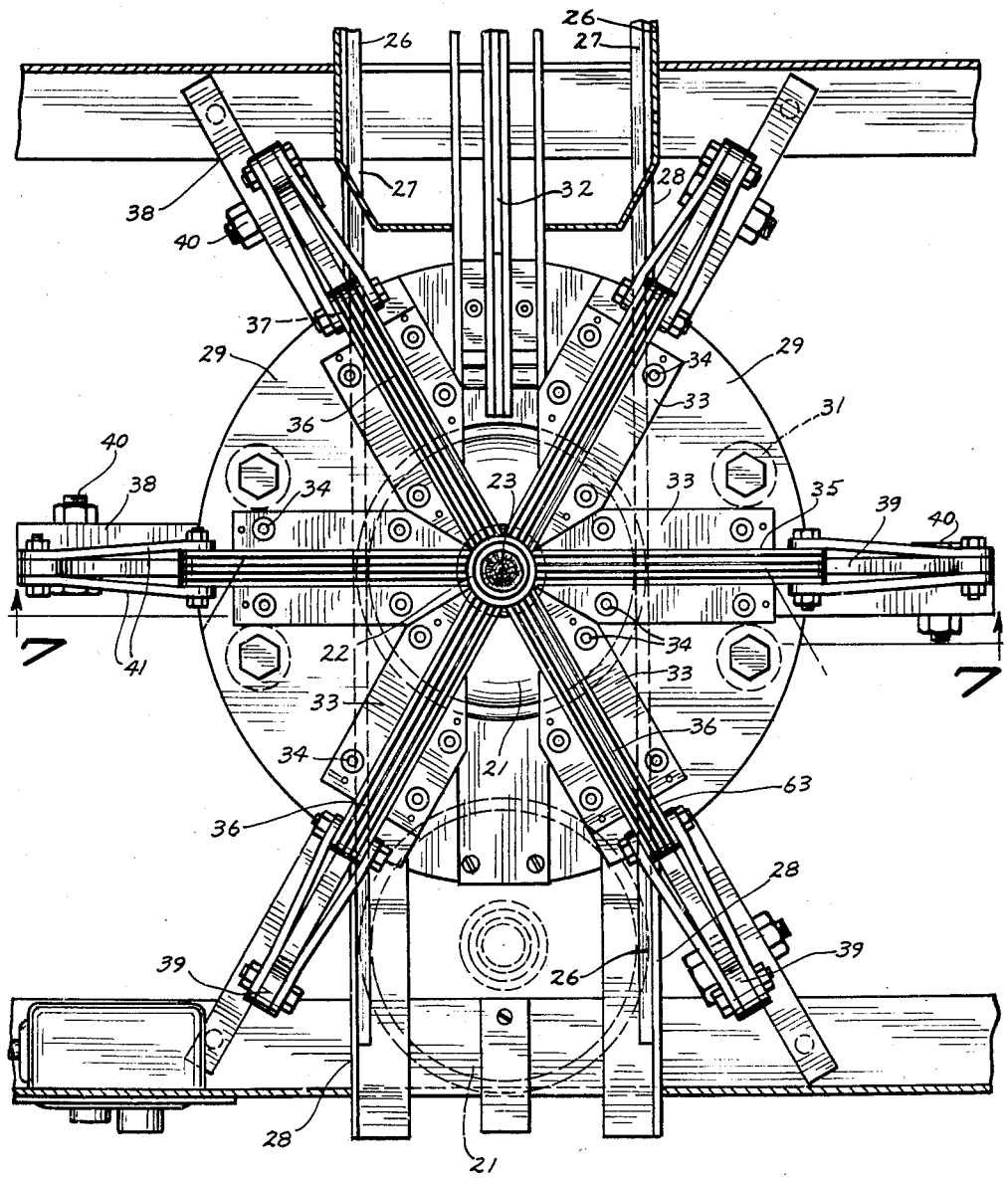
Fig. 6 is an enlarged, fragmentary, top plan view of a portion of a machine made according to the present invention and a tree stand with parts in section and parts broken away showing the relationship of the sliding plungers and the plates thereof as the plungers are moved to position where the forward surfaces of the plates have just made contact with a collar of the stand.

Referring to the drawings and the numerals of reference thereon, the method and machine of the present invention are for permanently affixing a tree such as a Christmas tree 20 into a tree stand such as 21 by constricting a tree stand collar 22 onto a tree trunk 23 of the tree 20 to have water tight relationship therewith. The tree stand 21 is of fluid-tight construction and before the stand collar 22 is constricted onto the tree trunk 23, liquid is introduced into the tree stand as best seen in Figs. 3 and 4. When the stand collar and the tree trunk are in fluid tight relationship to each other, the liquid inside of the stand cannot get out except as it travels up the tree. When this liquid travels up the tree, it will be useful to prolong the effective life of the tree as a symbol of Christmas.

A collar constricting machine denoted generally 25 includes a track 26 on which tree stands having heated collars can be slid from a heating machine such as indicated at 62 in Fig. 1 and positioned in operational alinement with collar constricting means of the machine and subsequently moved out of the machine after the stand collars have been permanently constricted around tree trunks 23 of Christmas trees 20. Said track consists of a pair of angle irons 27, 27 providing horizontal track surfaces on which the tree stands 21 will rest, and a pair of vertical side bars spaced from said angle irons to provide side guide surfaces. This track is supported in an upper portion of the main frame of the machine. Over this track there is fixedly mounted with respect to the frame of the machine, a pair of generally semi-circular plunger floor plates 29, 29. These two plunger floor plates are mounted in parallel spaced relationship to a single plunger floor supporting plate 30 by means of spacer rods 31. The track 26 is situated approximately midway between these plates. Mechanism such as that indicated at 32 can be provided between the plunger floor support plate 30 and the plunger floor plate 29, 29 to automatically move the tree stand 21 along the track 26 should this be desirable but this mechanism forms no part of the present invention.

The plunger floor plates 29, 29 are spaced from each other to allow passage of the unconstricted collar 22 therebetween.

Six different sets of plunger guide members 33 are bolted to the plunger floor plate 29, 29 as at 34 to provide a plurality of guideways 35 (six as shown) converging on a center axis of the floor plates 29, 29 and the support plate 30. Certain portions of these guide members are also cut away to provide a passageway for the collar 22 as the tree stand 21 moves along the track 26. A plunger 36 is associated with each of the guideways 35 and is slidably situated in said guideway and on one of said plunger floor plates 29, 29. The exact construction of these plungers will be described in detail later in the specification. At the present time it is sufficient to say that a rearward or outwardly extending end portion of each plunger is of solid construction and has an opening 37 therethrough. A plurality of supporting arms 38 extend outwardly radially from the axis of said plunger floor support plate 30 and a separate bell crank lever 39 is pivotally mounted as at 40 to each of the supporting arms 38. A bell crank lever-plunger connecting link 41 connects each of the bell crank levers 39 to one of the plungers 36.

A hydraulic cylinder 42 is fixedly supported with respect to the plunger floor support plate 30 through the instrumentality of support pipes 43 and a hydraulic piston 44 is operably mounted in said cylinder 42 to have a piston rod 45 connected thereto extending outwardly and upwardly from said hydraulic cylinder. The piston rod 45 includes an enlarged cylindrical portion 46 integral therewith at an upper portion thereof and a cylindrical horizontal flange 47 is also integral with said piston rod 45 and extends outwardly therefrom.

A bell crank lever rod 48 is pivotally mounted to an inwardly extending arm of each of said bell crank levers 39 as at 49 and each such rod 48 extends downwardly through an opening provided in said horizontal flange 47. Each of the bell crank lever rods 48 is provided with a head 50 at position spaced from and below the bottom of the horizontal flange 47 and a compression coil spring 51 surrounds each of these rods between said head 50 and the flange 47. A collar 52 is fastened to each rod 48 above the horizontal flange 47 in such position that the compression coil spring 51 will always be at least slightly compressed.

As illustrated diagrammatically in Fig. 7, where either of the electrical control buttons 53 are depressed, an electric circuit is set up through an electric switch 54 associated with said control button, a power source 55 and a solenoid 56. This solenoid is mechanically associated with a hydraulic valve 57 through the instrumentality of a hydraulic control rod 58. When the solenoid 56 is energized, the hydraulic control rod 58 will be caused to move thereby to position to allow passage of air supply from a source (not shown) along a pipe 59 through the the valve 57 and out a pipe 60 to an upper portion of the hydraulic cylinder 42 and to allow passage of air from a lower portion of the hydraulic cylinder 42 out of the pipe 61, through the valve 57 and to exhaust. When the electrical control system is interrupted and solenoid 56 is no longer energized, the hydraulic control rod 58 will move to position to allow passage of air along the air supply pipe 59, through the hydraulic valve 57, and the pipe 61 to said bottom portion of the hydraulic cylinder 42 and to allow passage of air out of the upper portion of said cylinder, along pipe 60, through hydraulic valve 57 to exhaust. The electrical switch 54, the solenoid 56, and the hydraulic valve 57 can be of any usual or preferred construction. In order to cause the constricting forces to be applied to the tree stand collar for a sufficient period to allow the collar to harden, the electrical control button 53 can be manually depressed over the necessary period or a time responsive interlock switch can be incorporated in the control circuit to provide this time delay in the relaxing of the constricting pressures.

The method of constricting the plastic collar onto the tree trunk will now be readily apparent. The tree stand 21 with the tree stand collar 22 mounted therein will first be subjected to heat sufficient to make the tree stand collar reach a state of semi-fluidity. This can be accomplished by means of heaters in a heating machine 62 or can be accomplished in any other usual or preferred manner. When the collar 22 is properly heated, the tree stand associated therewith will be placed on the track 26 and slid to position where the collar is concentric with the axis of the plunger floor plate 29, 29 and the plunger floor support plate 30. One of the electrical control buttons 53 will then be depressed to cause the hydraulic piston 44 to be forced downwardly with respect to the hydraulic cylinder 42. This will cause the downward movement of the piston rod 45 and the horizontal flange 47 integral therewith. Compression coil springs 51 acting against heads 50 on the bell crank lever rods 48 will force these rods downwardly and will cause the bell crank levers 39 to pivot about their pivot points 40. This will cause the lever-plunger connecting links 41 to be moved inwardly and the plungers will slide on the plunger floor plates, 29, 29 to be brought in contact with the hot semifluid collar.

The force of the plungers against the collar 22 will cause it to be constricted against the tree trunk 23. This constricting force can be applied over a sufficient period of time to allow the collar to become cooled and no longer semi-fluid. When this point is reached, the energization of the solenoid 56 is interrupted and the hydraulic control valve 57 will operate to allow the piston 44 to be powered in an upward direction to cause the plungers to be moved radially outwardly away from said collar 22 and tree trunk 23. The tree stand 21 and tree 20 now permanently mounted therein can be moved out of the machine along the track 26.

Now that the general operation of the machine has been explained, the particular construction of the plungers will be detailed. Each of the plungers is made up of a plurality (5 as shown) of plunger plates 63 and of spacers 64 therebetween. Each plunger plate is constituted as a flat rectangular bar which has been milled to provide a plurality of rectangular ridges and grooves therein. The rearward or outward end portion of each plunger is of solid construction as previously stated and consists of a sandwich construction of plunger plates 63 and spacers 64 fastened together through the instrumentality of rivets 65. Two outer spacers denoted 73 each extends between an outermost plate denoted 70 and the next adjacent intermediate plate denoted 72 from the rear end of the plunger 36 to a position near the center of the plunger in longitudinal direction. Inner spacers denoted 75 terminate substantially before this point is reached.

As previously stated, a plurality of grooves 66 and ridges 67 are milled into each face of each of the plunger plates 63. As will best be seen in Figs. 10, 11 and 12, the ridges 7 are smaller in vertical dimension than are the grooves 66. It is also to be noted that for every groove 66 on one side of a plunger plate 63 there is a corresponding ridge 67 on the other side thereof. This allows the interlocking action which will be later explained more fully.

As best seen in Figs. 6 and 9, the forward or collar contacting surface of each of the plunger plates 63 of each of the plungers 36 are milled so that they all lie on a circle of diameter exactly equal to the outer diameter of the unconstricted collar 22. This is illustrated in Fig. 6 where the action of the machine has been stopped at the point where each of the plunger plates of each of the plungers is just in contact with the outer surface of the unconstricted collar 22. At this point, each of the forward end or collar contacting surfaces 58 of the plunger plate 63 will appear as in Fig. 11. While Fig. 11 discloses only one plunger 36, it is to be understood that the next adjacent plunger plates 63 on either side of the outer plunger plates of Fig. 11 have a position with respect to these outer plunger plates of Fig. 11 identical with the positioning of each of the plates of said plunger plates within said plunger.

When the action of the plunger plates on the collar continues from the position as shown in Fig. 6, to the position as shown in Fig. 8, the outer edges of each of the outer plunger plates 70 of each plunger will be in contact with the corresponding outer edges of the adjacent plunger plates of the adjacent plunger. As the plungers move toward the center, this will cause the outer plunger plates 70 of each plunger to move toward a center plunger denoted 71. Since the outer spacers 73 extend for approximately half of the length of the plungers, each increment of deflection of the outer plunger plates 70 toward the center will cause an increment of deflection of the adjacent intermediate plates 72 equal to one half of the outer increment. In other words, as best seen in Fig. 9, as the plungers come closer together, a force is exerted on the outside of the forward ends of the outer plunger plates 70 as indicated by the arrows 69. These outer plates 70 will be deflected inwardly toward the innermost plate 71. Because of the stiffness of the outer plunger plates 70, however, a force will be transmitted through the outer spacers 73, 73 in the direction of the arrows 74 which will cause the intermediate plates 72, 72 to be deflected inwardly toward the innermost plunger plate 71 a distance equal to half of the distance which the outer plunger plates 70 were deflected. This action will continue until the end of each of the plungers looks like the plunger shown in Fig. 12. At this point each of the ridges 67 of each of the plunger plates will be in contact with the bottom of each of the grooves 66 of the next adjacent plate. This is obvious as to each of the plunger plates within the plunger illustrated in Fig. 12 and the same situation will apply as to the outer surface of each of the plunger plates with respect to the next adjacent outer surface of the adjacent plunger. From the foregoing, it will be understood that each of the forward end surfaces of each of the plunger plates has moved substantially radially inwardly from the time it first contacted the collar 22 until the collar is firmly constricted against the tree trunk 23.

The method of actually constricting the semi-fluid collar onto the tree trunk consists of contacting said collar with a plurality of spaced apart collar contacting surface elements and moving each of these surface elements radially inwardly toward the exact center of said collar.

While plungers made according to the present invention could vary quite widely in dimension, it has been found satisfactory to construct the plungers of plates having an overall thickness of one eighth of an inch and spacers having a thickness on the order of twenty five thousandths of an inch. A vertical plungr dimension of one and one quarter inches will be satisfactory. When the parts are positioned as seen in Figs. 6, 9 and 11, the space between the outer surface of the ridges 67 of any particular plate and the outer surface of the ridges 67 on the immediately adjacent plate will be equal to the thickness of the spacer between the plates or, as suggested, twenty five thousandths of an inch. When the plungers are positioned as seen in Figs. 8 and 12, the outer surfaces of the ridges 67 are in contact with the inner surface of grooves 66 of the adjacent plate. A satisfactory dimension from the bottom of the grooves 66 to the top of the ridges 67 is fifty thousandths of an inch. When the forward end of the plates 63 just touch the outer cylindrical surface of the unconstricted collar 22, these forward surfaces are spaced from each other only by the thickness of the spacers and as soon as any appreciable deflection takes place, as the forward surfaces of the plates move in toward the tree along radii of the collar, this spacing disappears and an overlapping takes place as each of the ridges 67 moves into a groove 66 of an adjacent plate. At this point, there is no further possibility of a straight vertical pipe or passageway being left between the tree and the inner surface of the collar as the entire circumference of the tree and collar is under direct pressure by the plunger plates.

As very clearly illustrated in Figs. 3 and 4, trees upon which the collars are to be constricted are very seldom exactly cylindrical and are much more likely to be substantially non-symmetrical. To insure a complete and perfect seal under these conditions, the spring, head and collar arrangement of mounting the bell crank lever rod 48 with respect to the horizontal flange 47 is employed. As will be readily apparent, the force of the piston 44 on the piston rod 45 is transmitted to the bell crank lever rods 48 through the instrumentality of the horizontal flange 47 and the compression coil springs 51. As the plungers 36 move inwardly and into contact with the collar 22 and as this collar makes contact with the tree trunk 23, equal force will be applied by all of the plungers because the strength of all of the compression coil springs 51 is the same. When the pressure being exerted by the plunger and their plunger plates is sufficient to overcome the strength of the compression coil springs 51, the plungers will stop moving and further movement of the piston 44 in downward direction will simply depress the spring 51. Should a protuberance on the tree such as that indicated at 76 be encountered by one of the plungers, that plunger will stop moving first and when the piston 44 continues its downward motion, the deflection of the spring 51 operably associated with said plunger will be greater than the deflection of the other springs. In this manner variations in the sizes and shapes of tree trunks is compensated for.

Because the protuberances or imperfections such as that indicated at 76 are not uniform over the vertical dimension of the plungers, it is desirable to cause the semi-fluid collar to tend to have a flow in a downward direction to insure that sufficient material in the collar will completely fill and seal all of the indentations in the trunk. To do this, the forward surface of each of the plunger plates 63 of each of the plungers 36 is tapered so that a line through this surface from the top edge thereof through a bottom portion will lie approximately one degree from the vertical. This is clearly illustrated in Fig. 10. To insure a proper shape to the portion of the collar between the completely constricted and the completely unconstricted portion thereof, each plunger plate 63 of each plunger 36 is relieved at a bottom forward portion thereof as indicated at 77. As best seen in Fig. 4, when a protuberance such as 76 is encountered by the plunger plate 63, the excess material displaced by said protuberance will be urged in a downward direction and will fill in any and all indentations in the bark and the tree trunk 23.

What is claimed is:

1. The combination with a malleable collar and a shaft positioned therein of a frame; a plurality of horizontally disposed plungers each slidable with respect to said frame;

each having a longitudinal axis thereof radially alined with respect to a common point and each having a collar contacting surface at an end thereof adjacent and spaced from said common point; means for supporting said malleable collar to be in horizontal alinement with said plungers and to have a central axis of said collar vertically disposed and passing through said common point; said plungers being disposed at equal intervals around the entire periphery of said collar; means for forcing said plungers to move simultaneously in direction toward said common point and against said collar to cause said collar to be constricted onto said shaft; and each of said plungers including a plurality of parallel spaced apart plunger plates each having a forward end surface constituted as a portion of said collar contacting surface, and spacers between and in contact with adjacent ones of each of said plunger plates in spaced relationship to said forward end surface thereof.

2. The combination as specified in claim 1 wherein outer forward edges of outer plunger plates of each plunger come into contact with corresponding outer forward edges of outer plunger plates of immediately adjacent plungers as said plungers move toward said common point and against said collar.

3. The combination as specified in claim 1 wherein at least a portion of said collar contacting surface extends outwardly from a top toward a bottom portion thereof at an angle other than vertical.

4. The combination as specified in claim 1 wherein each of said forward end surfaces of each of said plunger plates is provided with a plurality of ridges and grooves positioned to lie in intermeshing relationship with grooves and ridges of immediately adjacent plates.

5. The combination as specified in claim 1 wherein each of said forward end surfaces of each of said plunger plates is provided with a plurality of ridges and grooves positioned to lie in intermeshing relationship with grooves and ridges of immediately adjacent plates, and wherein outer forward edges of outer plunger plates of each plunger come into contact with corresponding outer forward edges of outer plunger plates of immediately adjace plungers as said plungers move toward said common point and against said collar.

6. The combination as specified in claim 5 wherein at least a portion of said collar contacting surface extends outwardly from a top toward a bottom portion thereof at an angle other than vertical.

7. The combination with a malleable collar and a shaft positioned therein of a frame; a plurality of horizontally disposed plungers each slidable with respect to said frame; each having a longitudinal axis thereof radially alined with respect to a common point and each having a collar contacting surface at an end thereof adjacent and spaced from said common point; means for supporting said malleable collar to be in horizontal alinement with said plungers and to have a central axis of said collar vertically disposed and passing through said common point; said plungers being disposed at equal intervals around the entire periphery of said collar; means for forcing said plungers to move simultaneously in direction toward said common point and against said collar to cause said collar to be constricted onto said shaft; and wherein said means for forcing said plungers to move simultaneously in direction toward said common point is constituted as a hydraulic cylinder, a hydraulic piston mounted in said cylinder, a piston rod operably connected to said piston, a separate bell crank lever rod for each of said plungers slidably mounted with respect to said piston rod, resilient means associated with each of said bell crank lever rods and said piston rod to permit movement of said piston rod in a first direction to impart movement to each of said bell crank lever rods in a first direction through the instrumentality of said resilient means, fixed means associated with each of said bell crank lever rods and said piston rod to allow movement of said piston rod in a second direction to impart movement to each of said bell crank lever rods in a second direction through said fixed means, a bell crank lever pivotally mounted on said frame, means operably associating a first end of each of said bell crank levers with one of said plungers, means operably associating a second end of each of said bell crank levers with one of said bell crank lever rods, and pressure means for causing said piston to move selectively in said first and in said second direction within said cylinder.

8. The method of constricting malleable collars onto tree trunks of non-uniform cross section and having generally tapering configuration from a large butt to a small peak; consisting of the following steps: placing a tree trunk inside of a malleable collar, contracting the outer periphery of said collar with a plurality of collar contacting elements substantially equally spaced around said periphery and each having a collar contacting face tapering outwardly of said collar from a first end thereof located toward the peak of said tree to a second end thereof located toward said butt, and simultaneously forcing each of said elements toward said collar along a straight path extending radially inwardly toward a central longitudinal axis of said collar until every element is causing an equal pressure to be exerted upon said collar and said trunk to bring said collar into sealing relationship with said trunk.

References Cited in the file of this patent

UNITED STATES PATENTS

| | | |
|---|---|---|
| 565,257 | Boyd | Aug. 4, 1896 |
| 1,911,775 | Smith et al. | May 30, 1933 |
| 2,478,231 | Bowers | Aug. 9, 1949 |
| 2,546,496 | Crawford | Mar. 27, 1951 |
| 2,639,754 | Macy | May 26, 1953 |